United States Patent [19]
Kaylo et al.

[11] Patent Number: 5,260,354
[45] Date of Patent: Nov. 9, 1993

[54] ADDITIVES FOR ELECTRODEPOSITABLE COATING COMPOSITIONS

[75] Inventors: Alan J. Kaylo, Glenshaw; Jerome A. Seiner, Pittsburgh; Edward E. McEntire; V. Eswarakrishnan, both of Allison Park, all of Pa.

[73] Assignee: PPG Industries, Inc., Pittsburgh, Pa.

[21] Appl. No.: 847,966

[22] Filed: Mar. 6, 1992

[51] Int. Cl.$^5$ .................................. C08L 63/00
[52] U.S. Cl. .................................. 523/402; 523/406; 523/407; 523/412; 523/413; 523/414; 524/457; 524/501; 524/502; 524/504
[58] Field of Search ............... 523/406, 407, 413, 402, 523/412, 414; 524/457, 504, 501, 502

[56] References Cited

U.S. PATENT DOCUMENTS

| | | | |
|---|---|---|---|
| 4,137,282 | 1/1979 | Otsuki et al. | 260/879 |
| 4,189,345 | 2/1980 | Foster et al. | 162/168 R |
| 4,294,741 | 10/1981 | Bosso | 260/29.6 NR |
| 4,297,261 | 10/1981 | Jozwiak, Jr. | 260/29.7 RP |
| 4,304,703 | 12/1981 | Das | 260/29.6 WB |
| 4,337,185 | 6/1982 | Wessling et al. | 524/458 |
| 4,432,850 | 2/1984 | Moriarity et al. | 204/181 C |
| 4,511,446 | 4/1985 | Abbey et al. | 204/181 C |
| 4,525,519 | 6/1985 | Leising | 524/457 |
| 4,624,762 | 11/1986 | Abbey et al. | 204/181.7 |
| 4,684,676 | 8/1987 | Diefenbach et al. | 523/411 |
| 4,785,030 | 11/1988 | Noda et al. | 523/201 |
| 4,791,161 | 12/1988 | Leising | 524/458 |

FOREIGN PATENT DOCUMENTS

41209/89  3/1990  Australia .
2454397   5/1976  Fed. Rep. of Germany .

Primary Examiner—Joseph L. Schofer
Assistant Examiner—R. H. Delmendo
Attorney, Agent, or Firm—William J. Uhl

[57] ABSTRACT

An additive for cationic electrodepositable coating compositions is disclosed which improves hiding ability, stability, rheology and oil spot resistance. The additive is present in amounts of between 0.5 to 40 weight percent and is prepared by polymerizing in aqueous medium, under free radically initiated conditions, an aqueous dispersion of a polymerizable, ethylenically unsaturated monomer composition in the presence of a cationic polymeric surface active substance. The coating composition additionally has between 60 to 99.5 weight percent of a cationic salt group containing film forming polymer. Also disclosed is a method for coating which includes electrodepositing the above composition on an electrically conductive cathode.

12 Claims, No Drawings

ADDITIVES FOR ELECTRODEPOSITABLE COATING COMPOSITIONS

FIELD OF THE INVENTION

The present invention relates to polymeric products useful as additives in electrodepositable coating compositions.

BRIEF DESCRIPTION OF THE PRIOR ART

Polymeric products made by the polymerization of diene and vinyl monomers in the presence of aqueous dispersions of anionic and cationic polymers are known in the art. For example, U.S. Pat. No. 4,055,527 to Jozwiak et al discloses polymerization of dienes, mixtures of dienes and vinyl monomers in aqueous dispersions in the presence of partially neutralized maleinized oils. U.S. Pat. No. 4,297,261 to Jozwiak discloses the polymerization of ethylenically unsaturated monomers in the presence of a cationic polyepoxide-amine adduct having pendant unsaturation. Polymerization is conducted in the presence of anionic oil-soluble free radical polymerization initiator, and the patent teaches that water soluble free radical catalysts are preferably not used.

U.S. Pat. No. 4,791,161 to Leasing discloses the preparation of a cationic latex which first includes the preparation by aqueous emulsion polymerization techniques of a vinyl monomer mixture including an amino group containing vinyl monomer and subsequent polymerization of vinyl monomers in the presence of an uncharged or a cationically charged free radical initiator.

Also well known are polymeric products which can be used as additives in electrodepositable coating compositions. For example, U.S. Pat. No. 4,432,850 to Moriarity et al. describes a polyepoxide-polyalkylenepolyamine resin additives which improves the flow and appearance of the electrodeposited coating.

Australian Patent Application 41209189 discloses aqueous dispersions of film forming resins capable of being deposited cathodically or anodically and 0.5 to 30 percent by weight of crosslinked polymeric microparticles. The microparticles are prepared by polymerizing vinyl monomers including a crosslinking monomer by aqueous emulsion polymerization techniques in the presence of water soluble free radical initiators including cationic initiators and low molecular weight surface active agents and protective colloids.

SUMMARY OF THE INVENTION

The present invention is directed to electrodepositable aqueous resinous dispersions comprising
(a) from about 0.5 to about 40 weight percent based on total weight of resin solids of a polymeric product which is prepared by polymerizing in an aqueous medium under free radical initiated conditions an aqueous dispersion of a polymerizable ethylenically unsaturated monomer composition in the presence of a cationic polymeric surface active substance, and
(b) from about 60 to about 99.5 weight percent based on total weight of resin solids of a cationic salt group containing film forming polymer which is electrodepositable on a cathode.

The present invention is also directed toward a method for coating a conductive substrate serving as a cathode in an electric circuit in which the circuit includes the cathode and an anode immersed in an aqueous cationic electrocoating composition. The process includes passing an electric current between the cathode and anode to cause the electrocoating composition to deposit as a coating on the cathode. The electrocoating composition is the electrodepositable aqueous resinous dispersion described above.

DETAILED DESCRIPTION OF THE INVENTION

The polymeric products when present as an additive in the electrodepositable aqueous resinous dispersions provide important properties and advantages to the dispersions when they are used in the electrodeposition process. By use of the polymeric products, the dispersions can be formulated with relatively low pigment to resin weight ratios while maintaining high hiding ability. The stability of the dispersion is improved because of the lower pigment content. In addition, dispersions of the present invention have improved rheology during electrodeposition compared to compositions without the polymeric product. Dispersions of the present invention also provide electrodeposited coatings with improved resistance to oil spotting by virtue of the polymeric product. The polymeric product particularly when formulated with high levels of inexpensive diene is a low cost component which typically reduces the cost of the dispersion.

The polymeric product of the present invention is prepared in aqueous medium under free radical initiated polymerization conditions. To prepare the polymeric product, an ethylenically unsaturated polymerizable monomer composition, for example, diene monomers, other vinyl monomers and mixtures thereof, are dispersed in aqueous medium and are subjected to free radical initiated addition polymerization conditions, for example, by heating in the presence of a free radical initiator. The polymerization is conducted in the presence of a cationic polymeric surface active substance which is described in detail below.

The monomer composition can be selected from a variety of polymerizable ethylenically unsaturated materials such as vinyl monomers including diene monomers and mixtures thereof. Examples of vinyl monomers which may be used are monoolefinic hydrocarbons such as $C_1$–$C_{18}$ alkyl acrylates and methacrylates. Specific examples include methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. The $C_1$–$C_{18}$ alkyl acrylates and methacrylates are typically used in amount of up to 90, preferably 10 to 50 percent by weight based on total weight of polymerizable ethylenically unsaturated monomers.

Besides the alkyl esters of acrylic and methacrylic acid mentioned above, substituted alkyl esters, for example, hydroxyalkyl esters such as hydroxyethyl and hydroxypropyl acrylate and methacrylate can also be used. These monomers are typically used in amounts of up to 40, preferably 5 to 25 percent by weight.

Examples of other vinyl monomers are esters of organic acids such as vinyl acetate and isopropenyl acetate; allyl compounds such as allyl cyanide; halogenated monomers, such as vinyl chloride, vinylidene chloride and vinylidene flouride; amides of acrylic and methacrylic acid such as acrylamide and methacrylamide and their N-alkoxymethyl derivatives such as N-ethoxymethyl and N-butoxymethyl acrylamide and methacrylamide. Also, vinyl aromatic compounds such as styrene, alpha-methyl styrene, alpha-chloromethyl styrene and vinyl toluene may be used, as well as organic nitriles such as acrylonitrile and methacrylonitrile. Mixtures of the above mentioned vinyl monomers may be used. These other vinyl monomers are typically used in amounts up to 70, preferably 10 to 50 percent by weight.

Various dienes which may be used include 1,3-butadiene, isoprene and most of the di-unsaturated members of the alkylidene series including both the unsubstituted and substituted conjugated diolefins. The substituted diolefins may be those containing lower alkyl groups or halogen groups directly bonded to the alkylidene chain. Representative examples of these diolefins include chloroprene and 2,3-dimethylbutadiene. Also, mixtures of dienes as well as mixtures of dienes and the other aforementioned vinyl monomers can be used. The diene monomers are used in amounts of 20 to 100, preferably 30 to 95 percent by weight.

Other suitable monomers can be those which are reactive with the surface active substance, and cause grafting between the surface active substance and the polymerizing ethylenically unsaturated monomers. Examples of such monomers include glycidyl acrylate and methacrylate. These grafting monomers when used are used in amounts up to 20 percent by weight.

The surface active substance of the present invention is a cationic polymeric material typically derived from polyepoxides, polyvinyl alcohols or vinyl polymers. In a preferred embodiment, the polymeric surface active substance is one in which the polymer prior to cationic salt group formation is prepared by non aqueous polymerization techniques, that is prepared neat or in the presence of an organic solvent rather than aqueous emulsion or other aqueous polymerization techniques. Solvents which can be used for organic solution polymerization include alcohols such as ethanol, tertiary butanol, tertiary amyl alcohol; ketones such as acetone, methyl ethyl ketone; and ethers such as dimethyl ether of ethylene glycol. Preparing polymers neat or in organic solvent, allows control of the molecular weight of the resulting polymers. Low molecular weight polymers are preferred in the practice of the invention. More specifically, the number average molecular weight of the resulting polymer is preferably below about 50,000, more preferably below about 25,000, and most preferably below about 20,000, as measured by gel permeation chromatography using a polystyrene standard. Although higher molecular weight products having molecular weights of 500,000 or more can be used. The most preferred polymers are polyepoxide amine adducts which are prepared by reacting polyepoxides with amines neat or in organic solvent.

The polyepoxides have a 1,2-epoxy equivalency greater than 1, preferably about 2 or more. Preferred are polyepoxides which are difuiictional with regard to epoxy. The preferred polyepoxides are polyglycidyl ethers of cyclic polyols. Particularly preferred are polyglycidyl ethers of polyphenols such as bisphenol A. These polyepoxides can be produced by etherification of a polyphenol with epihalohydrin or dihalohydrin such as epichlorohydrin or dichlorohydrin in the presence of alkali. Examples of polyphenols other than bisphenol A are 1,1-bis-(4-hydroxyphenyl)ethane, 2-methyl-1,1-bis(4-liydroxyphenyl)propane, 2,2-bis(4-hydroxy-3-tertiarybutylphenyl)propane, bis-(2-hydroxynaphthyl)methane, 1,5-dihydroxynaphthalene or the like.

Besides polyphenols, other cyclic polyols can be used in preparing the polyglycidyl ethers of cyclic polyol derivatives. Examples of other cyclic polyols would be alicyclic polyols, particularly cycloaliphatic polyels, such as 1,2-cyclohexanediol, 1,4-cyclohexanediol, 1,2-bis(hydroxymethyl)cyclohexane, 1,3-bis(hydroxymethyl)cyclohexane and hydrogenated bisphenol A.

Also, oxyalkylated adducts such as ethylene and propylene oxide adducts of these alicyclic polyols and polyphenols mentioned above can be used as the cyclic polyol component.

Examples of other polyepoxides are polyglycidyl ethers of polyhydric alcohols, such as ethylene glycol, diethylene glycol, triethylene glycol, 1,2-propylene glycol, 1,3-propylene glycol, 1,4-butylene glycol, 1,5-pentanediol and the like.

Polyglycidyl esters of polycarboxylic acids which are produced by reaction of epichlorohydrin or a similar epoxy compound with an aliphatic or aromatic polycarboxylic acid can also be used. Examples of polycarboxylic acids are dicarboxylic acids such as adipic acid, succinic acid, glutaric acid, terephthalic acid, dimerized linoleic acid and the like.

The polyepoxides such as the preferred polyglycidyl ethers of cyclic polyols can be further reacted to chain extend and increase their molecular weight. For example, they may be further reacted with active hydrogen-containing materials which are reactive with the epoxy groups such as those containing primary hydroxy groups. Examples of chain extenders are organic polyols, preferably polymeric polyols such as polyester polyols including polylactone polyols. Chain extending of epoxy-containing polymeric materials with polymeric polyols is disclosed in U.S. Pat. No. 4,148,772 to Marchetti, Zwack and Jerabek and assigned to PPG Industries, Inc.

The polyepoxides can also be chain extended with N-heterocyclic-containing materials such as described in U.S. Pat. No. 4,144,159 to Bosso and Castellucci and assigned to PPG Industries, Inc.

In addition to the polyepoxides mentioned above which are prepared by condensation polymerization techniques, polyepoxides which are prepared by polymerizing epoxy groups containing vinyl monomers such as those mentioned above in connection with the polymerizable ethylenically unsaturated monomer composition can also be used.

The polyepoxide is reacted with an amine neat or optionally in the presence of an organic solvent to form the polyepoxide amine adduct. The adduct is then at least partially neutralized with an aqueous acidic solution to form the cationic amine salt group in the polymer. Examples of amines include ammonia, primary, secondary and tertiary amines and mixtures thereof. Reaction conditions of polyepoxides with amines, examples of various amines and at least partial neutralization with acid are disclosed in U.S. Pat. No. 4,260,720, column 5, line 20, to column 7, line 4, the portions of which are hereby incorporated by reference. Besides cationic amine salt group containing polymers, cationic ternary sulfonium salt group containing polymers can also be used in the practice of the invention. These Polymers can be prepared by reacting a polyepoxide as described above with a sulfide acid mixture as is discussed in U.S. Pat. No. 3,894,932 to Bosso et al and U.S. 3,793,278 to Debona.

The cationic polymeric surfactant can also be a prepared by polymerizing under free radical initiated polymerization conditions a mixture of vinyl monomers including an amino group containing vinyl monomer such as diethylaminoethylmethacrylate or tertiary butylethylmethacrylate. These polymers are prepared in organic solution by techniques well known in the art. Examples of other vinyl monomers are those mentioned above in connection with the polymerizable ethylenically unsaturated monomer component. The cationic polymeric surfactant used in the invention should have sufficient cationic salt group content to stabilize the polymerization of the polymerizable ethylenically unsaturated monomer component and to provide for a stable electrodepositable dispersion. Also the polymer should have sufficient cationic salt group content that when used with the cationic salt containing polymer (b) described in more detail below to form the electrodepositable resinous dispersion, the dispersion upon being subjected to electrodeposition conditions will deposit as a coating on the cathode. Typically, the cationic polymeric surfactant will contain from 0.1 to 5.0, preferably from 0.3 to 1.1 milliequivalents of cationic salt groups per gram of polymer solids.

As mentioned above, the surface active substance serves as a dispersant for the subsequent polymerization of the dispersed phase of the polymerizable, ethylenically unsaturated monomer composition. The monomer composition is dispersed in aqueous medium in the presence of the cationic polymeric surface active substance and subjected to addition polymerization conditions by heating in the presence of a free radical initiator. The time and temperature of polymerization will depend on one another, the ingredients selected and possibly the scale of the reaction. Usually polymerization will be between about 2 to 20 hours at 40° C. to 100° C.

The free radical initiator of the present invention may be selected from any of those used for aqueous latex polymerization techniques, including redox pair initiators, peroxides, hydroperoxides, peroxydicarbonates, azo compounds and the like. A preferred embodiment is azo initiators including cationic salt group containing azo initiators such as 2,2'-azobis(2-amidino-propane) dihydrochloride, 2,2'-azobis(N,N'-dimethyleneisobutyramidine) dihydrochloride, the acid salts such as lactate, acetate or mixed salts of 2,2'-azobis(2-amidino-propane), 2,2'-azobis(N,N'-dimethyleneisobutyramidine). Other suitable cationic free radical initiators include 2,2'-azobis(2-methyl-N-phenylpropionamidine) dihydrochloride, 2,2'-azobis[N-(4-chlorophenyl)-2-methylpropionamidine] dihydrochloride, 2,2'-azobis[N-(4-hydroxyphenyl)-2-methylpropionamidine] dihydrochloride, 2,2'-azobis[2-methyl-N-(phenylmethyl)propionamidine] dihydrochloride, 2,2'-azobis[2-methyl-N-(2-propenyl)propionamidine] dihydrochloride, 2,2'-azobis(2-methylpropionamidine) dihydrochloride, 2,2'-azobis[N-(2-hydroxyethyl)-2-methylpropionamidine] dihydrochloride, 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane] dihydrochloride, 2,2'-azobis[2-(5-hydroxy-3,4,5,6-tetrahydropyrimidin-2-yl)propane] dihydrochloride, 2,2'-azobis[2-[1-(2-hydroxyethyl)-2-imidazolin-2-yl]] propane] dihydrochloride, and 2,2'-azobis[2-(2-imidazolin-2-yl)propane].

Examples of nonionic azo initiators include 2,2'-azobis(2,4-dimethylvaleronitrile), 2,2'-azobis(isobutyronitrile), 2,2'-azobis(methylbutyronitrile) and 1,1'-azobis(cyanocyclohexane), 2,2'-azobis[2-methyl-N-[1,1-bis(hydroxymethyl)-2-hydroxyethyl] propionamide] and 2,2'-azobis[2-methyl-N-(2-hydroxyethyl) propionamide].

Examples of redox pair initiators include tertiary butyl hydroperoxide (TBHP)/isoascorbic acid; TBHP/hydroxylamine; TBHP/sodium formaldehyde sulfoxylate.

The free radical initiator is typically present in amounts between about 0.01% and about 5%, more preferably between about 0.05% and about 2.0%, and most preferably between about 0.1% and about 1.5% based on the weight of the ethylenically unsaturated monomers.

Preferably, a chain transfer agent which is soluble in the monomer component such as alkyl mercaptans, for example, tertiary-dodecyl mercaptan, 2-mercaptoethanol, isooctyl mercaptopropionate, n-octyl mercaptan or 3-mercapto acetic acid is preferably used in the polymerization. Other chain transfer agents such as ketones, for example, methyl ethyl ketone, and chlorocarbons such as chloroform can be used. Chain transfer agents provide the necessary control over molecular weight to give products having the required viscosity for electrodeposition. If used, the amount of chain transfer agent should be about 0.1 to 6.0 percent by weight based on weight of polymerizable monomer composition.

Relatively high molecular weight multifunctional mercaptans may be substituted, all or partially, for the chain transfer agent. These molecules can range in molecular weight from about 94 to 1000 or more. Functionality can be from about 2 to about 4. Amounts of these multifunctional mercaptans, if used, should be about 0.1 to about 6.0 percent based on the weight of polymerizable monomer composition. A particularly useful higher molecular weight extender is a liquid polysulfide polymer terminated by mercaptan groups and is available from Morton Thiokol as LP-33.

Preferred polymeric products are obtained by using about 2.0 to about 50, preferably about 20 to about 35 percent by weight of the cationic polymeric surface active substance and from about 50 to about 97.5, preferably about 65 to about 80 percent by weight of the dispersed phase of the polymerizable ethylenically unsaturated monomer component in the polymerization reaction. The percentage by weight being based on total weight of the dispersant and the dispersed phase.

For polymerization of the dispersed phase in the presence of the dispersant, the aqueous medium generally is present in amounts of about 40 to 90, more typically about 50 to 75 percent by weight based on total weight of the dispersant, the dispersed phase and the aqueous medium.

Besides water, the aqueous medium can contain some organic cosolvents. The organic cosolvents are preferably at least partially soluble with water. Examples of such solvents include oxygenated organic solvents such as monoalkyl ethers of ethylene glycol, diethylene glycol, propylene glycol, and dipropylene glycol which contain from 1 to 10 carbon atoms in the alkyl group such as the monoethyl and monobutyl ethers of these glycols. Examples of other at least partially water-miscable solvents include alcohols such as ethanol, isopropanol, butanol and diacetone alcohol. If used, the organic cosolvents are used in amounts less than 10 and preferably less than 5 percent by weight based on total weight of the aqueous medium.

Polymeric products can be prepared in accordance with the present invention to form stable aqueous dispersions. By stable is meant the dispersions will not gel, flocculate nor precipitate at a temperature of 25° C. for at least 60 days. If some precipitation does occur, the precipitate can be easily redispersed by low shear agitation. The aqueous dispersions are usually two-phase, translucent to opaque, aqueous polymer systems in which the aqueous phase forms the continuous phase.

The polymeric products of the present invention can be made to contain active hydrogens such as hydroxyl, primary and secondary amino which make them reactive at elevated temperatures with a curing agent. The curing agent which may be used should be one which is stable in the dispersion of the polymeric product at room temperature but reactive with the active hydrogens at elevated temperature, that is, from about 90° C. to 260° C., to form a crosslinked product. Examples of suitable curing agents are described below.

The polymeric products described above are formulated with cationic salt group containing film forming polymers which are electrodepositable on the cathode and which are different from the polymeric product to form the electrodepositable aqueous resinous dispersions of the invention. The polymeric product and the cationic salt group containing film forming polymer can be combined by blending the two together with mild agitation.

The cationic electrodepositable polymers can be any such resin known to those in the art, including, in some instances, the cationic polymeric surface active substance used to prepare the polymeric product as described above. The cationic polymer is also preferably substantially free of diene-derived polymeric material. For example, such resins include high throwpower amine salt group-containing resins which are the acid-solubilized reaction products of polyepoxides and primary and secondary amines such as are described in U.S. Pat. No. 4,031,050 to Jerabek. Usually, these amine salt group containing resins are used in combination with a blocked isocyanate curing agent such as those discussed more fully below. In addition, the cationic electrodepositable resin of the present invention can be low throwpower resins such as cationic acrylic resins. Examples of these resins are described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine acid salt. Such resins are described in U.S. Pat. Nos. 3,962,165; 3,975,346 and 4,001,156 to Bosso and Wismer. Examples of other cationic resins are ternary sulfonium salt group-containing resins such as those described in U.S. Pat. No. 3,793,278 to DeBona. Also, cationic electrodepositable resins which cure via a transesterification mechanism such as described in European Patent Application No. 12463 can also be employed, The amount of polymeric product in the electrodepositable aqueous resinous dispersion of the present invention is preferably within the range of about 0.5 weight percent to about 40 weight percent, more preferably from about 5 weight percent to about 40 weight percent and most preferably from about 5 weight percent to about 20 weight percent, based upon total weight of resin solids. The cationic electrodepositable resin is preferably present in amounts of about 60 weight percent to about 99.5 weight percent, more preferably from about 60 weight percent to about 95 weight percent, most preferably from about 80 to 95 weight percent based on total weight of resin solids.

The blend of polymeric product and conventional cationic electrodepositable resin is in the form of an aqueous dispersion. The term "dispersion" is believed to be, as described above, a two-phase, transparent, translucent or opaque resinous system in which the resin is the dispersed phase and water is the continuous phase. The average particle size diameter of the resinous phase is generally less than about 10 and preferably less than about 5 microns. The resin solids content of the electrodepositable aqueous resinous dispersion of the present invention depends upon the particular end use of the dispersion and is in general not critical. Aqueous dispersions containing at least about 1 and usually from about 5 to about 40 percent by weight resin solids are typical. For electrodeposition use, resin solids contents of about 5 to about 20 percent are usually used. By resin solids is meant the non volatile organic content of the dispersion, i.e., organic materials which will not volatilize when heated to 1100° C. for 15 minutes and would exclude organic solvents.

Besides water, the aqueous medium may contain some organic cosolvent. The organic cosolvents are preferably at least partially soluble with water. Examples of such solvents include oxygenated organic solvents such as monoalkyl ethers of ethylene glycol, diethylene glycol, propylene glycol and dipropylene glycol which contain from 1 to 10 carbon atoms in the alkyl group such as the monoethyl and monobutyl ether of these glycols. Examples of other water-miscible solvents include alcohols such as ethanol, isopropanol, butanol and diacetone alcohol. If used, the organic cosolvents are used in amounts less than 10 and preferably less than 5 percent by weight based on total weight of the aqueous medium.

The electrodepositable aqueous resinous dispersion can include a curing agent to react with the polymeric product and the conventional cationic electrodepositable resin. Examples of suitable curing agents are capped or blocked isocyanates, aminoplast resins and phenolic resins such as phenolformaldehyde condensates including allyl ether derivatives thereof. Examples of capped isocyanates are those described in U.S. Pat. No. 4,104,147, column 7, line 36, continuing to column 8, line 37, the portions of which are hereby incorporated by reference. Sufficient capped isocyanate is present such that the equivalent ratio of latent isocyanate groups to active hydrogens of the polymer is at least about 0.1:1, preferably about 0.3 to 1:1.

Examples of aminoplast resins are those described in U.S. Pat. No. 3,937,679 to Bosso and Wismer in column 16, line 3, continuing to column 17, line 47, the portions of which are hereby incorporated by reference. Also disclosed in the aforementioned portions of the '679 patent, the aminoplast can be used in combination with the methylol phenol ethers. Aminoplast curing agents usually constitute from about 1 to about 60, preferably about 5 to about 40 percent by weight of the resinous composition based on total weight of aminoplast and the polymeric product.

In some instances, a pigment composition, and if desired, various additives such as fillers, plasticizers, anti-oxidants, UV light absorbers, defoamers, fungicides, flow control agents, surfactants or wetting agents are included in the dispersion. The pigment composition may be of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as the pigment-to-resin weight ratio. In the practice of the present invention, the pigment-to-resin weight ratio is usually within the range of 0.03 to 0.35, when pigment is used. The other additives mentioned above are usually in the dispersion in amounts of about 0.01 to about 3 percent by weight based on total weight of resin solids. By resin is meant the non volatile organic content of the dispersion, i.e., organic materials which will not volatilize when heated to 110° C. for 15 minutes and would exclude organic solvents.

For electrodeposition use, the aqueous dispersion is placed in contact with an electrically conductive anode and an electrically conductive cathode with the surface to be coated being the cathode. Following contact with the aqueous dispersion, an adherent film of the coating composition is deposited on the cathode and a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but typically between 50 and 500 volts. The current density is usually between 0.5 ampere and 15 amperes per square foot and tends to decrease during electrodeposition indicating the formation of an insulating film.

The aqueous dispersions of the present invention can also be used in non-electrophoretic coating applications such as flow, dip, spray and roll coating applications. For electrodeposition and non-electrophoretic coating applications, the coating compositions of the present invention can be applied to a variety of electroconductive substrates especially metal such as steel, aluminum, copper, magnesium and the like, but also including metallized plastic and conductive carbon-coated materials. For non-electrophoretic coating applications, compositions can be applied to the non-metallic substrates such as glass, wood and plastic.

After the coating has been applied it is cured, usually by baking at elevated temperature such as 90° C.–260° C. for about 1–30 minutes. The cured coating will generally have a thickness of about 0.1 to about 10, usually about 0.5 to about 5 mils, depending upon the solids content of the coating composition and the method of applying the coating.

Illustrating the invention are the following examples, which, however, are not to be considered as limiting the invention to their details. All quantities are on a weight basis unless otherwise indicated.

EXAMPLE 1

A capped polyisocyanate crosslinker was prepared from the following mixture of ingredients:

| Ingredients | Parts by Weight |
|---|---|
| Polyisocyanate[a] | 4095.0 |
| Methyl isobutyl ketone | 2199.6 |
| Dibutyltin dilaurate | 6.2 |
| 2-(2-butoxyethoxy)ethanol | 3353.0 |
| Trimethylol propane | 356.1 |
| 2-(2-butoxyethoxy)ethanol | 464.2 |

[a]Polymeric diphenylmethane-4,4'-diisocyanate available from Mobay Chemical Company as MONDUR MRS-4.

The polyisocyanate, methyl isobutyl ketone and dibutyltin dilaurate were charged to a reaction flask and heated under a nitrogen atmosphere to 30° C. The first portion of the 2-(2-butoxyethoxy)ethanol was added slowly while holding the temperature between 60° C. and 65° C. Upon completion of the addition, the reaction mixture was held at 65° C. for 90 minutes. The trimethylol propane was then added and the mixture heated to 110° C. and held there for three hours whereupon the final portion of the 2-(2-butoxyethoxy) ethanol was added. The 110° C. hold was continued until infrared analysis indicated no unreacted NCO remained.

EXAMPLE 2

A cationic salt group containing polymer, used as a surface active substance in the present invention, was prepared from the following mixture of ingredients:

| Ingredients | Parts by Weight (grams) |
|---|---|
| EPON 828 | 1023.0 |
| Bisphenol A-ethylene oxide adduct (1/6 molar ratio) | 365.0 |
| Bisphenol A | 297.0 |
| Methyl isobutyl ketone | 88.7 |
| Benzyldimethylamine | 1.4 |
| Benzyldimethylamine | 4.2 |
| Crosslinker of Example 1 | 1783.9 |
| Diketimine[1] | 113.7 |
| N-methylethanolamine | 98.6 |
| 88% aqueous lactic acid | 109.6 |
| Surfactant[2] | 51.4 |
| Deionized Water | 2252.7 |
| Deionized Water | 1360.4 |
| Deionized Water | 2137.7 |

[1]Diketimine derived from diethylenetriamine and methyl isobutyl ketone (73% solids in methyl isobutyl ketone)
[2]Cationic surfactant prepared by blending 120 parts of alkyl imidazoline commercially available from Geigy Industrial Chemicals as GEIGY AMINE C, 120 parts of an acetylenic alcohol commercially available from Air Products and Chemicals as SURFYNOL 104, 120 parts of 2-butoxyethanol, 221 parts by weight of deionized water and 19 parts of glacial acetic acid.

The EPON 828, bisphenol A-ethylene oxide adduct, bisphenol A and methyl isobutyl ketone were charged into a reaction vessel and heated under nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for one half hour, cooled further to 145° C. and the second portion of benzyldimethylamine added. The reaction mixture was held at 145° C. until a reduced Gardner-Holdt viscosity (50 percent resin solids in 2-methoxypropanol) of P-Q was obtained. At this point, the crosslinker, the diketimine and N-methylethanolamine were added in succession. The mixture was allowed to exotherm and then a temperature of 125° C. was established. After one hour at 125° C., the resin was dispersed in aqueous medium by adding it to a mixture of the lactic acid, surfactant and the first portion of deionized water. The dispersion was further thinned in stages with the second and third portions of deionized water and vacuum stripped to remove organic solvent to give a dispersion having a solids content of 38.9 percent and a particle size of 1100 Å.

EXAMPLE 3

A cationic salt group containing polymer, used as a surface active substance in the present invention, was prepared from the following mixture of ingredients.

| Ingredients | Parts by Weight (grams) |
| --- | --- |
| EPON 828 | 940.0 |
| Bisphenol A | 420.7 |
| 2-hexyloxy ethanol | 159.0 |
| Ethyl triphenyl phosphonium iodide | 1.4 |
| Crosslinker of Example 1 | 1441.8 |
| Diketimine[1] | 95.6 |
| N-methylethanolamine | 79.6 |
| 88% aqueous lactic acid | 147.7 |
| Deionized Water | 1532.7 |
| Deionized Water | 1070.1 |
| Deionized Water | 1681.4 |

[1]Diketimine derived from diethylenetriamine and methyl isobutyl ketone (73% solids in methyl isobutyl ketone)

The EPON 828, bisphenol-A and 2-hexyloxy ethanol were charged into a reaction vessel and heated under a nitrogen atmosphere to 110° C. Ethyl triphenyl phosphonium iodide then was added and the reaction mixture heated to 130° C. The reaction was allowed to exotherm to about 185° C. The reaction mixture was cooled to 160° C. and was held at 160° C. for one hour. Reduced Gardner-Holdt viscosity (50 percent resin solids in 2-methoxy propanol) at this stage was W. The reaction mixture was cooled to 145° C. and the crosslinker, the diketimine and N-methylethanolamine were added in succesion. The mixture was allowed to exotherm and then a temperature of 125° C. was established. After one hour at 125° C., the resin was dispersed in aqueous medium by adding it to a mixture of lactic acid and the first portion of deionized water. The dispersion was further thinned in stages with the second and third portions of deionized water and vacuum stripped to remove organic solvent to give a dispersion having a solids content of 35.7 percent and a particle size of 581 Å.

EXAMPLE 4

A polymeric product of the present invention is prepared with the following procedure using a cationic salt group containing polymeric surface active substance and a chain transfer agent. To a 1 gallon stainless steel autoclave equipped with a stirrer, steam-water jacket and thermocouple was charged 1678 g deionized water and 836.9 g of an aqueous solution of polymeric surface active substance of Example 2 (@37.6% solids).

The autoclave was evacuated to ca. 2 psia, then repressured with nitrogen to ca. 60 psig. This cycle was repeated. The reactor was then evacuated to 4 psia, then sealed. The stirrer was started and maintained at 500 rpm. After 15 minutes, the following were fed into the reactor at ambient temperature over 20 minutes:
77.2 g butadiene
28.9 g of a solution of 2,2'-Azobis[2-(2-imidazolin-2-yl)propane (1.89 g), water (298.1 g), and 88% lactic acid (1.87 g)
41.7 g of the following monomer solution:
   140.0 parts by weight (ppw) styrene
   140.0 ppw 2-hydroxyethylmethacrylate
   32.7 ppw tert.-dodecyl mercaptan
   40.0 ppw TRITON ® X-15 (1.5 mole ethylene oxide adduct of octyl phenol available from Union Carbide)

The reactor temperature was increased to 65° C. over 20 minutes. Then over 3 hours were added the following ingredients:
437.3 g butadiene
163.8 g of the aqueous catalyst solution above
236.1 g of the monomer solution above.

After 10 hours, the pressure had declined from 61 to 10.3 psig. The reactor contents solids were 29.4% in a reactor sample, as measured by 20 minutes at 130° C. at 15 inches Hg in a vacuum oven.

The reactor contents were then discharged into a 2 gallon vessel and stripped of butadiene monomer by applied vacuum of 6 psia at 60° C. after 100 g deionized water was added. A slow nitrogen stream was introduced into the liquid during the stripping to aid in removal of the butadiene. The stripping was completed in 5.5 hours, and <10 ppm butadiene remained in the liquid.

The final product weighed 3126 g (less samples taken). The viscosity was 9.6 centipoises at 25° C. (Brookfield, spindle #1, 60 rpm). The final solids was 29.7% as measured by the method above. Less than 0.1 g coagulum was present (measured by solids remaining after passing through a 200 mesh screen and dried by the vacuum oven method above). The product molecular weight was 38,000, as measured by GPC, using a polystyrene standard and tetrahydrofuran as solvent.

EXAMPLE 5

A polymeric product of the present invention is prepared with the following procedure using a cationic polymeric surface active substance and a chain extender. In an experiment similar to Example 4, with the exception being replacement of the tert. dodecyl mercaptan with LP-33 liquid polysulfide polymer (available from Morton Thiokol Inc., Morton Chemical Division) on a weight for weight basis, a latex polymer was prepared with following characteristics:
Weight: 3105 g
Viscosity: 8.0 centipoise
Solids: 28.8%
Coagulum: 3.8 g
Molecular weight (Mw): 49,000
Peak reaction pressure was 78 psig, final pressure was 17.3 psig. Reaction time was 10 hours and 20 minutes.

EXAMPLE 6

A polymeric product of the present invention is prepared with the following procedure using a polymeric surface active substance and a chain transfer agent. To a 1 gallon stainless steel autoclave equipped with a stirrer, steam-water jacket and thermocouple was charged 1370 g deionized water and 1356 g of an aqueous solution of the cationic polymeric surfactant of Example 2 (@39.4% solids).

The autoclave was evacuated to ca. 2 psia then repressured with nitrogen to ca. 60 psig. This cycle was repeated. The reactor was then evacuated to 4 psia, then sealed. The stirrer was started and maintained at 500 rpm. After 15 minutes, the following were fed into the reactor at ambient temperature over 20 minutes:
78.8 g butadiene 30 g of a solution of 2,2'-Azobis[2-(2-imidazolin-2-yl)propane (1.18 g), water (298.8 g), and 85% lactic acid (1.17 g)
7.48 g of the following solution:
  46.0 g tert.-dodecyl mercaptan
  78.9 g TRITON ® X-15
The reactor temperature was increased to 55° C. over 20 minutes. Then over 3 hours were added the following ingredients:
446.3 g butadiene
170.0 g of the aqueous catalyst solution above
42.4 g of the chain transfer agent-surfactant solution above.
After 10 hours, the pressure had declined from 74 to 22 psig.

The reactor contents solids were 29.1% in a reactor sample, as measured by 20 minutes at 130° C. at 15 inches Hg in a vacuum oven.

The reactor contents were then discharged into a 2 gallon vessel and stripped of butadiene monomer by applied vacuum of 6 psia at 60° C. after 100 g deionized water was added. A slow nitrogen stream was introduced into the liquid during the stripping to aid in removal of the butadiene. The stripping was completed in 5.5 hours, and <10 ppm butadiene remained in the liquid.

The final product weighed 2893 g (less samples taken). The viscosity was 7.4 centipoises at 25° C. (Brookfield, spindle #1, 60 rpm). The final solids was 29.4% as measured by the method above. Less than 0.1 g coagulum was present (measured by drying solids remaining after passing through a 200 mesh screen).

EXAMPLE 7

A polymeric product of the present invention is prepared with the following procedure using a cationic polymeric surface active substance and a chain transfer agent. In an experiment similar to Example 4, the difference being that the initiator and its neutralizing agent, lactic acid, were increased 6.67 fold, but still fed into the reactor as before over 15 minutes, then in the second stage over 3 hours. The maximum pressure was 49 psig.

The reaction was complete in 5 hours and 20 minutes. The final pressure was 8.5 psig. The product had the following characteristics:
Weight: 2952g
Viscosity: 8.4 centipoise
Solids: 30.4%
Coagulum: <0.1

EXAMPLE 8

A cationic polymeric product of the present invention is prepared with the following procedure using a cationic polymeric surface active substance and a chain transfer agent. An experiment was run which was similar to that of Example 4, except the amount of catalyst used was increased by 33%, and the monomer weight ratios of butadiene:styrene:hydroxyethylmethacrylate were 70:25:5. The reaction time was 7.5 hours. Maximum pressure was 61.6 psig. The product had the following characteristics:
Weight: 3207 g
Viscosity: 8.9 centipoise
Solids: 29.7%
Coagulum: <0.1

EXAMPLE 9

A polymeric product of the present invention is prepared with the following procedure using a cationic polymeric surface active substance and a chain transfer agent. To a 1 gallon stainless steel autoclave equipped with a stirrer, steam-water jacket and thermocouple was charged 1772 g deionized water and 731.2 g of an aqueous solution of polymeric surfactant of Example 3, (35.9% solids).

The autoclave was evacuated to ca. 2 psia then repressured with nitrogen to ca. 60 psig. This cycle was repeated. The reactor was then evacuated to 4 psia, then sealed. The stirrer was started and maintained at 500 rpm. After 15 minutes, the following were fed into the reactor at ambient temperature over 20 minutes:
94.5 g butadiene
30.0 g of a solution of 2,2'-Azobis[2-(2-imidazolin-2-yl)propane (1.77 g), water (298.1 g), and 85% lactic acid (1.75 g).
32.48 g of the following monomer solution:
  53.0 ppw styrene
  159.0 ppw 2-hydroxyethylmethaerylate
  37.11 ppw tert.-dodecyl mercaptan
  42.11 ppw Triton X-15
The reactor temperature was increased to 65° C. over 20 minutes. Then over 3 hours were added the following ingredients:
535.5 g butadiene
170.0 g of the aqueous catalyst solution above
184.1 g of the monomer solution above.
After 8.2 hours, the pressure had declined from 67.3 to 6.8 psig.

The reactor contents solids were 30.2% in a reactor sample, as measured by 20 minutes at 130° C. at 15 inches Hg in a vacuum oven.

The reactor contents were then discharged into a 2 gallon vessel and stripped of butadiene monomer by applied vacuum of 6 psia at 60° C. after 100 g deionized water was added. A slow nitrogen stream was introduced into the liquid during the stripping to aid in removal of the butadiene. The stripping was completed in 5.5 hours, and <10 ppm butadiene remained in the liquid.

The final product weighed 3034 g (less samples taken). The viscosity was 19 centipoises at 25° C. (Brookfield, spindle #1, 60 rpm). The final solids was 30.6% as measured by the method above. Less than 0.1 g coagulum was present (measured by solids remaining after passing through a 200 mesh screen).

EXAMPLE 10

A cationic electrodeposition bath to be used as a control was formulated from a mixture of 1636.3 g cationic polymer as described in Example 2, 35.7 g Hexyl Cellosolve ® (available from Union Carbide), 230.7 g of a pigment paste which contained 3.0 g carbon black, 60.9 g titanium dioxide, 12.8 g lead silicate, 35.6 g china clay, and 9.2 g dibutyltinoxide ground in a pigment grinding vehicle as described in Example C of U.S. Pat. No. 4,891,111 and 1898 g deionized water. The resulting cationic electrodeposition paint had a solids content of 21.1% and a pigment to binder ratio of 0.18/1.0.

After 20% ultrafiltration, the bath was evaluated as follows. Zinc phosphated steel panels were electrodeposited in the bath for 2 minutes, 85° F., at 260 volts. After baking the panels at 340° F. for 30 minutes, films were obtained having a thickness of 1.08 mils.

EXAMPLE 11

A cationic electrodeposition bath was formulated from a mixture of 1649.7 g of a cationic binder of Example.10, 30.4 g Hallcomid ® M8-10, 168.9 g of a pigmeilt paste which contained 1.9.g carbon black, 38.1 g titaniwn dioxide, 12.8 g lead silicate, 22.3 g china clay, 9.0 g dibutyltinoxide ground in the pigment grinding vehicle of Example 10, and 1000 g deionized water. Hallcomid ® M8-10 is a fatty acid amide available from The C. P. Hall Co. To this was added 357.7 g emulsion resin dispersion as described in Example 4, and enough water to give a bath solids of 22.2%. The resulting cationic electrodeposition paint had a solids content of 22.2% and a pigment to binder ratio of 0.11/1.0.

After 20% ultrafiltration, the bath was evaluated as follows. Zinc phosphated steel panels were electrodeposited in the bath for 2 minutes, 85° F., at 245 volts. After baking the panels at 340° F. for 30 minutes, films were obtained having a thickness of 1.16 mils.

EXAMPLE 12

A cationic electrodeposition bath was formulated from a mixture of 1675.8 g cationic binder of Example 11, 36.6 g of the formal of 2-(2-n-butoxyethoxy) ethanol, 102.1 g of a pigment paste which contained 1.2 g carbon black, 39.5 g titanium dioxide, 18.5 g lead silicate, 12.3 g dibutyltinoxide ground in the pigment grinding vehicle of Example 10, and 1000 g deionized water. To this was added 395.1 g emulsion resin dispersion as described in Example 5; and enough water to give a bath solids of 22.4%. The resulting cationic electrodeposition paint had a solids content of 22.4% and a pigment to binder ratio of 0.07/1.0.

After 20% ultrafiltration, the bath was evaluated as follows. Zinc phosphated steel panels were electrodeposited in the bath for 2 minutes, 85° F., at 260 volts. After baking the panels at 340° F. for 30 minutes, films were obtained having a thickness of 1.14 mils.

EXAMPLE 13

A cationic electrodeposition bath was formulated from a mixture of 1399.5 g cationic binder of Example 10, 34.9 g of the formal of 2-(2-n-butoxyethoxy) ethanol, 157.2 g of a pigment paste which contained 1.9 g carbon black, 61.7 g titanium dioxide, 12.4 g lead silicate, 10.2 g dibutyltinoxide ground in the pigment grinding vehicle of Example 10, and 1000 g deionized water. To this was added 516.3 g emulsion resin dispersion as described in Example 6, and enough water to give a bath solids of 22.3%. The resulting cationic electrodeposition paint had a solids content of 22.3% and a pigment to binder ratio of 0.11/1.0.

After 20% ultrafiltration, the bath was evaluated as follows. Zinc phosphated steel panels were electrodeposited in the bath for 20 minutes, 85° F., at 230 volts. After baking the panels at 340° F. for 30 minutes, films were obtained having a thickness of 1.26 mils.

EXAMPLE 14

A cationic electrodeposition bath similar to that of Example 11 was prepared except that 108.6 g emulsion resin solids of Example 4 were replaced with 108.6 g emulsion resin solids of Example 7 and the quantity of deionized water was adjusted to give a bath solids of 22.2%. The resulting cationic electrodeposition paint had a solids content of 22.2% and a pigment to binder ratio of 0.11/1.0.

After 20% ultrafiltration, the bath was evaluated as follows. Zinc phosphated steel panels were electrodeposited in the bath for 2 minutes, 85° F., at 230 volts. After baking the panels at 340° F. for 30 minutes, films were obtained having a thickness of 1.17 mils.

EXAMPLE 15

A cationic electrodeposition bath similar to that of Example 11 was prepared except that 108.6 g emulsion resin solids of Example 4 were replaced with 108.6 g emulsion resin solids of Example 8 and the quantity of deionized water used was adjusted to give a bath solids of 22.2%. The resulting cationic electrodeposition paint had a solids content of 22.2% and a pigment to binder ratio of 0.11/1.0.

After 20% ultrafiltration, the bath was evaluated as follows. Zinc phosphated steel panels were electrodeposited in the bath for 2 minutes, 85° F., at 260 volts. After baking the panels 340° F. for 30 minutes, films were obtained having a thickness of 1.12 mils.

EXAMPLE 16

A cationic electrodeposition bath was formulated from a mixture of 1535.8 g cationic binder of Example 10, 30.4 g Hallcomid ® M8-10, 168.8 g of a pigment paste which contained 1.9 g carbon black, 38.1 g titanium dioxide, 12.8 g lead silicate, 22.3 g china clay, 9.0 g dibutyltinoxide ground in the pigment grinding vehicle of Example 10, and 1000 g deionized water. To this was added 316.0 g emulsion resin dispersion as described in Example 9, and enough water to give a bath solids of 22.2%. The resulting cationic electrodeposition paint had a solids content of 22.2% and a pigment to binder ratio of 0.11/1.0.

After 20% ultrafiltration, the bath was evaluated as follows. Zinc phosphated steel panels were electrodeposited in the bath for 2 minutes, 85° F., at 230 volts. After baking the panels at 340° F. for 30 minutes, films were obtained having a thickness of 1.10 mils.

RESULTS

The appearance, gloss and reverse impact characteristics of the coatings of Examples 10-16 were evaluated. The results of these evaluations are shown below in Table 1.

TABLE 1

| Example | Appearance[1] | 20/60° Gloss[2] | Reverse Impact[3] (in-lbs.) |
|---|---|---|---|
| 10 | 9 (cratered) | 53/91 | <40 |
| 11 | 5+ | 60/94 | 80 |
| 12 | 6 | 44/89 | 160 |
| 13 | 9 (cratered) | 65/95 | 100 |
| 14 | 8 | 29/79 | <40 |
| 15 | 6 | 58/93 | 160 |
| 16 | 8 | 21/69 | <40 |

[1]Appearance — 0 tight film; 10 — smooth film
[2]Gloss — measured on MULTI-GLOSS M Multi Angle Refractometer
[3]Reverse Impact measured on a Gardner Impact Tester as per ASTM D2794 (Gardner Laboratories, Bethseda, MD)

The crater resistance or oil spot resistance of the coatings of Examples 10-16 was evaluated. To determine the crater resistance of the cationic paint, zinc phosphated steel panels were sprinkled with commonly used chain lubricants. The top half of the panel was spotted with Lubecon ATS-GM oil. The panel was then electrodeposited as described above, cured and rated accordingly. Results are recorded in Table 2.

TABLE 2

| Example | Crater Rating (0–10, 10 — Best) |
|---|---|
| 10 | 1 |
| 11 | 2 |
| 12 | 9+ |
| 13 | not run — film cratered |
| 14 | 4+ |
| 15 | 3+ |
| 16 | 4+ |

What is claimed is:

1. An electrodepositable aqueous resinous dispersion, comprising:
   (a) from about 5 to about 40 weight percent based on total weight of resin solids of a polymeric additive prepared by polymerizing in aqueous medium, under free radical initiated conditions, an aqueous dispersion of a polymerizable, ethylenically unsaturated monomer composition in which the monomers are selected from the group consisting of diene monomers and mixtures of diene monomers with monomers selected from the group consisting of $C_1$–$C_{18}$ alkyl acrylates and methacrylates, hydroxy alkyl esters of acrylic and methacrylic acid, vinyl aromatic compounds and halogenated monomers; said monomer mixture containing at least 20 percent by weight of said diene monomer, in the presence of a cationic polymeric surface active substance which is present in the electrodepositable aqueous resinous dispersion; and
   (b) from about 60 to about 95 weight percent based on total weight of resin solids of a cationic salt group containing film forming polymer which is electrodepositable on a cathode.

2. A dispersion, as claimed in claim 1, wherein the $C_1$–$C_{18}$ alkyl acrylate and methacrylate is an alkyl ester of acrylic or methacrylic acid containing from 1 to 8 carbon atoms in the alkyl group.

3. A dispersion, as claimed in claim 1, wherein the vinyl aromatic compound is styrene.

4. A dispersion, as claimed in claim 1, wherein said halogen-containing monomer is vinyl chloride.

5. A dispersion, as claimed in claim 1, wherein said aqueous medium in which said polymeric additive is prepared further comprises a chain transfer agent.

6. A dispersion, as claimed in claim 1, wherein said aqueous medium in which said polymeric additive is prepared further comprises a mercaptan-containing substance.

7. A dispersion, as claimed in claim 6, wherein said mercaptan-containing substance is mercaptan-containing polysulfide.

8. A dispersion, as claimed in claim 1, wherein (b) is a cationic polyepoxide-amine adduct.

9. A dispersion, as claimed in claim 1, wherein said polymeric additive is prepared in the presence of a cationic salt group containing free radical initiator.

10. A dispersion, as claimed in claim 9, wherein said free radical initiator is an azo free radical initiator.

11. A dispersion, as claimed in claim 10, wherein said azo free radical initiator comprises a compound selected from the group consisting of
    2,2'-azobis(N,N'-dimethyleneisobutyramidine) dihydrochloride,
    2,2'-azobis)2-amidinopropane) dihydrochloride, acid salts of
    2,2'-azobis(N,N'-dimethyleneisobutyramidine), acid salts of
    2,2'-azobis(2-amidinopropane), and mixtures thereof.

12. An electrodepositable aqueous resinous dispersion, comprising:
    (a) from about 5 to about 40 weight percent based on total weight of resin solids of a polymeric additive prepared by polymerizing in aqueous medium, under free radical initiated conditions, an aqueous dispersion of a polymerizable, ethylenically unsaturated monomer composition in which the monomers are selected from the group consisting of diene monomers and mixtures of diene monomers with monomers selected from the group consisting of $C_1$–$C_{18}$ alkyl acrylates and methacrylates, hydroxy alkyl esters of acrylic and methacrylic acid, vinyl aromatic compounds and halogenated monomers; said monomer mixture containing at least 20 percent by weight of said diene monomer, in the presence of an at least partially acid-neutralized polyepoxide-amine adduct which is present in the electrodepositable aqueous resinous dispersion; and
    (b) from about 60 to about 95 weight percent based on total weight of resin solids of a cationic salt group containing film forming polymer which is electrodepositable on a cathode.

* * * * *